United States Patent
Xu et al.

(10) Patent No.: US 9,093,901 B2
(45) Date of Patent: Jul. 28, 2015

(54) SWITCHING CONVERTER AND METHOD FOR CONTROLLING A SWITCHING CONVERTER

(75) Inventors: Weiwei Xu, Santa Clara, CA (US); Zhiliang Hong, Shanghai (CN); Dirk Killat, Cottbus (DE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 804 days.

(21) Appl. No.: 13/199,703

(22) Filed: Sep. 6, 2011

(65) Prior Publication Data
US 2012/0062030 A1 Mar. 15, 2012

(30) Foreign Application Priority Data
Sep. 6, 2010 (EP) .................................. 10175483

(51) Int. Cl.
*H02M 3/158* (2006.01)
*H02J 1/10* (2006.01)

(52) U.S. Cl.
CPC .......... *H02M 3/1582* (2013.01); *Y10T 307/406* (2015.04)

(58) Field of Classification Search
CPC ....................................................... H02J 1/10
USPC ........................................................... 307/58
See application file for complete search history.

(56) References Cited

U.S. PATENT DOCUMENTS

| 7,378,823 | B2 | 5/2008 | Yamanaka et al. | |
|---|---|---|---|---|
| 2004/0201281 | A1* | 10/2004 | Ma et al. | 307/38 |
| 2008/0284397 | A1 | 11/2008 | Chang | |
| 2009/0102440 | A1 | 4/2009 | Coles | |
| 2011/0043181 | A1* | 2/2011 | Jing et al. | 323/288 |
| 2011/0267020 | A1* | 11/2011 | Granat | 323/284 |

FOREIGN PATENT DOCUMENTS

| DE | 102005062902 | 10/2006 |
|---|---|---|
| EP | 1 146 629 | 10/2001 |
| EP | 1 689 069 | 8/2006 |
| EP | 2 200 163 | 6/2010 |

OTHER PUBLICATIONS

"A Dual-Mode Single-Inductor Dual-Output Switching Converter With Small Ripple," by Weiwei Xu et al., IEEE Transactions on Power Electronics, vol. 25, No. 3, Mar. 2010, pp. 614-623.
European Search Report, 10175483.6-1242/2426811, Mail date—Mar. 12, 2012.

* cited by examiner

*Primary Examiner* — Robert Deberadinis
(74) *Attorney, Agent, or Firm* — Saile Ackerman LLC; Stephen B. Ackerman

(57) ABSTRACT

This invention provides a switching converter having a number N of outputs providing N output signals, said switching converter being operable in at least a boost mode. The switching converter has at least one inductor, a number of switches, and a controlling device for controlling a charging time of the at least one inductor at least by the switches such that a discharging time of the at least one inductor is constant.

32 Claims, 5 Drawing Sheets

SWITCHING CONVERTER AND METHOD FOR CONTROLLING A SWITCHING CONVERTER

BACKGROUND OF THE INVENTION (1) Field of the Invention

This invention relates generally to switching converters and relates more specifically to buck-boost switching regulators having a number N of outputs providing N output signals and at least one inductor and to a method for controlling such a switching converter and to control circuits and methods thereof.

(2) Description of the Prior Art

A switching regulator provides a regulated output voltage V1 to a load based on an unregulated input voltage source Vg. The unregulated input voltage source Vg may be provided by means of a battery.

FIG. 1 illustrates a conventional buck-boost switching regulator power stage that may—depending on the control sequences of the switches—regulate output voltages V1 that are higher, the same or lower than the input voltage Vg.

Hereby, the four switches S1, S2, S3 and S4 control the transfer of the energy from the input node Vg to the output node V1 via an energy storing element (i.e. an inductor).

Depending on the voltage level provided at the input note Vg, there exist different operation modes to generate the required output node voltage V1, depending on if V1 is required to be lower (i.e. V1<Vg) or higher (i.e. V1>Vg) than the input voltage Vg.

Hereby, the mode with V1<Vg is referred to as buck-mode, wherein the mode with V1>Vg is referred to as boost-mode.

A third mode is referred to as buck-boost mode and is established when the required output voltage V1 is close to the input voltage Vg. This buck-boost mode is established to support a smooth transition between the affiliated buck and boost modes.

Assuming the control signals of the four switches S1, S2, S3 and S4 are d1, d2, d3 and d4 (note (for x=1 to 4): Sx is closed (conducting) if dx=1, and Sx is open (non-conducting) if dx=0).

Because S1 and S2, S3 and S4 are complementary switches, there are two independent control signals needed in the power stage. According to the switches states, the power stage can be divided into four states:

State1: d1=1 & d3=1
State2: d1=1 & d3=0
State3: d1=0 & d3=0
State4: d1=0 & d3=1

A duty ratio D0 is in the following defined in relation to a normalized period or a normalized time span of 1.

Buck mode (d1=D0, d3=0)

In the buck mode the VLX2 terminal of the inductor remains always connected to the output terminal V1, that means that S3 is always in non-conducting state (i.e. S3=0) and S4 is always in conducting state (i.e. S4=1).

Switches S1 and S2 are controlled to change their state inverse phased such that for a switching sequence of a normalized period of 1, S1=1 for duty ratio D0, wherein S2=1 for the subsequent normalized time span (1−D0).

The resulting buck-mode control signals and states are depicted in FIG. 2.

Under steady-state input voltage and output load conditions, this results in an output voltage V1, that depends on the input terminal voltage Vg and the duty ratio D0 as follows: V1=Vg*D0/1. The coil current is equivalent to the output current ($I_L$=I1).

Boost mode (d1=1, d3=D0):

In the boost mode the VLX1 terminal of the inductor remains always connected to the input terminal Vg, that means that S2 is always in non-conducting state (i.e. S2=0) and S1 is always in conducting state (i.e. S1=1).

Switches S3 and S4 are controlled to change their state inverse phased such that for a switching sequence of normalized period 1, S3=1 for duty ratio D0, wherein S4=1 for the subsequent normalized time span (1−D0).

Under steady-state input voltage and output load conditions this results in an output voltage V1 that depends on the input terminal voltage Vg and the duty ratio D0 as follows: V1=Vg*1/(1−D0) wherein d1=1, d3=D0

For the averaged inductor and output currents under steady state conditions results:

$I_L$=I1*1/(1−D0). The control sequence is depicted in FIG. 3.

Document EP 1 146 629 A2 describes a control circuit and a method for maintaining high efficiency in a buck-boost switching regulator. The switching regulator can regulate an output voltage higher, lower, or the same as the input voltage. The switching regulator may be synchronous or non-synchronous. The control circuit can operate the switching regulator in buck mode, boost mode, or buck-boost mode. In buck mode, the switching regulator regulates an output voltage that is less than the input voltage. In boost mode, the switching regulator regulates an output voltage that is greater than the input voltage. In buck and boost modes, less than all of the switches are switched ON and OFF to regulate the output voltage to conserve power. In buck-boost mode, all of the switches switch ON and OFF to regulate the output voltage to a value that is greater than, less than, or equal to the input voltage.

SUMMARY

According to an aspect of the invention, a switching converter is provided having a number N of outputs providing N output signals, N≥1. The switching converter may be operable in at least a boost mode. The switching converter may have at least one inductor, a number of switches, and a controlling device. The controlling device may be configured to control a charging time of the at least one inductor at least by the switches such that a discharging time of the at least one inductor is essentially constant or constant.

According to an embodiment, the switching converter is operable in the boost mode, in a buck mode and in a buck-boost mode.

According to a further embodiment, the switching converter has a first switch being coupled between a terminal providing a generator potential and an input terminal of the inductor, a second switch being coupled between the input terminal of the inductor and a ground terminal, a third switch being coupled between an output terminal of the inductor and the ground terminal and at least one fourth switch being coupled between the output terminal of the inductor and one of the N outputs.

According to a further embodiment, the controlling device is configured to provide at least one adjusting signal with constant duration in dependence on a control deviation of the output signal for driving the switches.

According to a further embodiment, the switching converter comprises an error amplifier, said error amplifier being configured to provide an error amplifier output signal. The controlling device may be configured to provide at least one adjusting signal with constant duration for converting the error amplifier output signal for driving the switches.

According to a further embodiment, in the boost mode and in the buck-boost mode, the switching converter is configured to extend the constant duration of the at least one adjusting signal for providing an adjustable first phase for the charging time and a constant second phase for the discharging time.

In this regard, the switching converter may be configured to adjust the first phase for the charging time in dependence on the actual voltage of the output signal.

According to a further embodiment, the switching converter is configured to provide a drive signal for driving the third switch in dependence on the actual voltage of the output signal for adjusting the first phase for the charging time.

According to a further embodiment, in the boost mode, the controlling device is configured to provide a first adjusting signal with constant duration and a second adjusting signal with a variable duration, wherein the second adjusting signal has a longer duration than the first adjusting signal, said variable duration being adapted in dependence on the control deviation of the output signal.

According to a further embodiment, in the buck-boost mode, the controlling device is configured to provide a first adjusting signal with constant duration and a second adjusting signal with a variable duration, wherein the second adjusting signal is amplitude-shifted compared to the first adjusting signal, said variable duration being adapted in dependence on the control deviation of the output signal.

According to a further embodiment, in the buck mode, the controlling device is configured to control the transition from the buck mode to the buck-boost mode or to the boost mode in dependence on the difference or ratio of the adjusting signal and the value of the constant duration.

According to a further embodiment, in the boost mode, the controlling device is configured to control the transition from the boost mode to the buck-boost mode or to the buck mode in dependence on the difference or ratio of the value of the variable duration of the adjusting signal and the value of the constant duration.

According to a further embodiment, the variable duration is adapted in dependence on the error amplifier output signal.

According to a further embodiment, the first adjusting signal and the second adjusting signal are embodied as saw tooth signals, wherein the peak of the second adjusting signal corresponds to the amplitude of the error amplifier output signal.

According to a further embodiment, in the buck mode, the controlling device is configured to provide one single adjusting signal with constant duration. The adjusting signal may be embodied as a saw tooth signal.

According to a further embodiment, the switching converter is configured to provide a drive signal for driving the first switch by comparing the adjusting signal with the error amplifier output signal.

According to a further embodiment, the switching converter has a further controlling device for controlling the discharging time such that a cycle time corresponding to a sum of the charging time and the discharging time remains constant, wherein said further controlling device has a slower response than the controlling device.

According to a further embodiment, the further controlling device is a Phase-Locked Loop (PLL).

According to a further embodiment, the switching converter has a plurality N of outputs providing N output signals (N≥2).

According to a further embodiment, the switching converter comprises one single inductor.

According to further aspect of the invention, a method is provided for operating a switching converter having a number N of outputs providing N output signals, at least one inductor, and a number of switches, wherein said switching converter is operable at least in a boost mode. The method has a step of controlling a charging time of the at least one inductor by means of at least the switches such that a discharging time of the at least one inductor is constant.

Further features of the method may be directly derived from the features of the switching converter.

Like or functionally alike elements in the figures have been allocated the same reference signs if not otherwise indicated.

DESCRIPTION OF THE PREFERRED EMBODIMENTS

Figure 1:
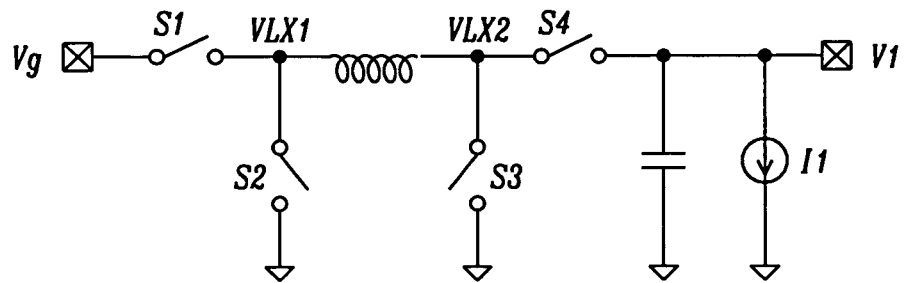
FIG. 1 shows a power stage of buck-boost converter.
Figure 2:
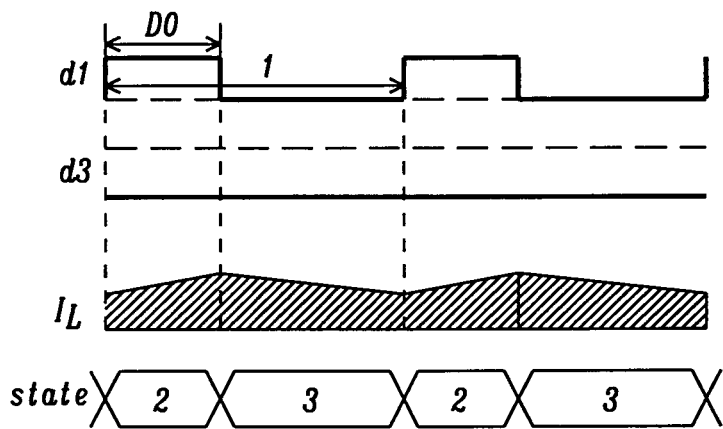
FIG. 2 shows a control sequence and inductor current in buck mode.
Figure 3:
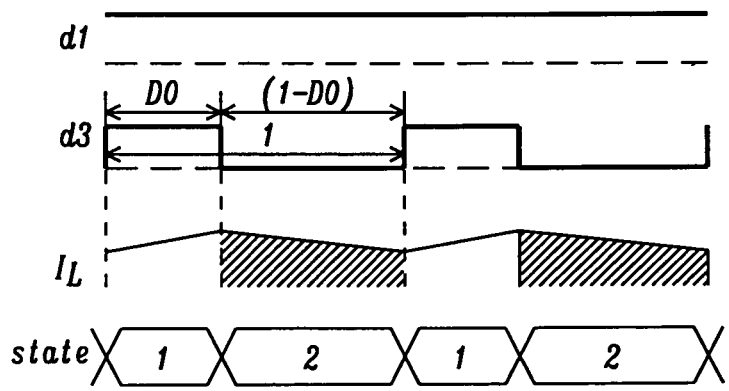
FIG. 3 shows a control sequence and inductor current in boost mode.
Figure 4:
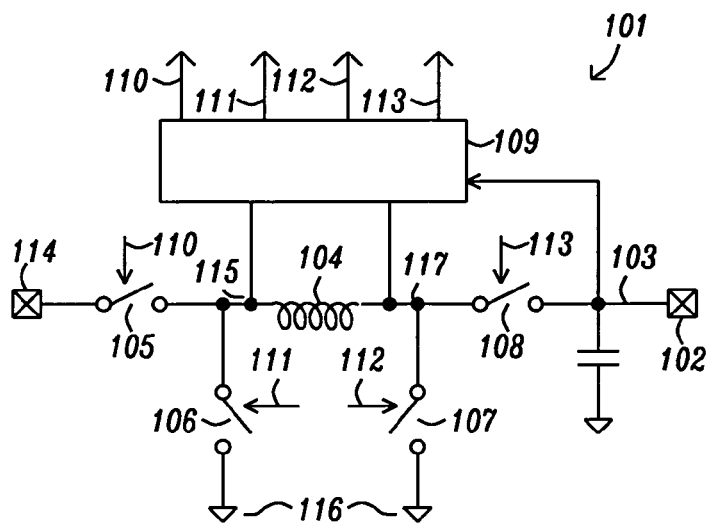
FIG. 4 shows an embodiment of a switching converter.

FIG. 4 shows an embodiment of a switching converter 101. The switching converter 101 has a number N of outputs 102 providing N output signals 103.

Without loss of generality, FIG. 4 shows a switching converter 101 with a single output 102 providing one output signal 103. The switching converter 101 of FIG. 4 may be operable in a boost mode, in a buck mode and in a buck-boost mode.

The switching converter 101 has an inductor 104, a first switch 105, a second switch 106, a third switch 107, a fourth switch 108 and a controlling device 109.

The controlling device 109 is configured to control a charging time of the inductor 104 by the switches 105-108 such that a discharging time of the inductor 104 is essentially constant or constant.

For controlling the first switch 105, the controlling device 109 provides a first drive signal 110. For controlling the second switch 106, the controlling device 109 provides a second drive signal 111. For controlling the third switch 107, the controlling device 109 provides a third drive signal 112. For controlling the fourth switch 108, the controlling device 109 provides a fourth drive signal 113.

The first switch 105 is coupled between a terminal 114 providing a generator potential and an input terminal 115 of the inductor 104. The second switch 106 is coupled between the input terminal 115 of the inductor 104 and a ground terminal 116. The third switch 107 is coupled between an output terminal 117 of the inductor 104 and the ground terminal 116. The fourth switch 113 is coupled between the output terminal 117 of the inductor 104 and the output 102.

In particular, the controlling device 109 is configured to provide a number of adjusting signals with constant duration in dependence on a control deviation of the output signal 103 for driving the switches 105-108. Further, the switching converter 101 may comprise an error amplifier for providing an error amplifier output signal. Alternatively, the switching converter 101 may have an Analogue-Digital Converter (ADC).

The controlling device 109 may be configured to provide the at least one adjusting signal with constant duration for converting the error amplifier output signal for driving the switches 105-108.

In the boost mode and in the buck-boost mode, the switching converter 101 may be configured to extend the constant duration of the adjusting signals for providing an adjustable first phase for the charging time and a constant second phase for the discharging time. Said first phase may be adjusted dependent on the actual voltage of the output signal 103. Particularly, the drive signal 112 for driving the third switch 107 may be provided in dependence on the actual voltage of the output signal 103 for adjusting the first phase of the charging time.

Moreover, in the boost mode, the controlling device 109 may be configured to provide a first adjusting signal with constant duration and a second adjusting signal with a variable duration. Said second adjusting signal may have a longer duration than the first adjusting signal. The variable duration may be adapted in dependence on the control deviation of the output signal 103.

Further, in the buck-boost mode, the controlling device 109 may be configured to provide a first adjusting signal with constant duration and a second adjusting signal with variable duration. The second adjusting signal may be amplitude-shifted compared to the first adjusting signal. As above, the variable duration may be adapted in dependence on the control deviation of the output signal 103.

Particularly, said variable duration may be adapted in dependence on the above-discussed error amplifier output signal.

Moreover, in the buck mode, the controlling device 109 may be configured to provide one single adjusting signal with constant duration.

In particular, said above-mentioned adjusting signals may be embodied by saw tooth signals. For example, the switching converter 101 may be configured to provide the first drive signal 110 for driving the first switch 105 by comparing the adjusting signal with the error amplifier output signal.

In the following, embodiments for constant discharging-time boost-mode (see A), constant discharging-time buck-boost mode (see B) and a control method for buck-boost mode transition (see C) are described:

A) Constant Discharging-Time Boost-Mode

From small signal analysis, the conventional constant frequency boost converter may have the disadvantage of a gain varying with D0.

A constant discharging time is in the following also referred to as constant OFF-time.

In the constant OFF-time control, the duration time of d4 is fixed as 1, and duty ratio of d3 is modulated, that results in the following steady state equations:

$(d1=1+d0, d3=D0, \text{i.e. } d4=1)$ $v_I=V_g(1+D_0), I_L=I_I(1+D_0)$

Figure 5:
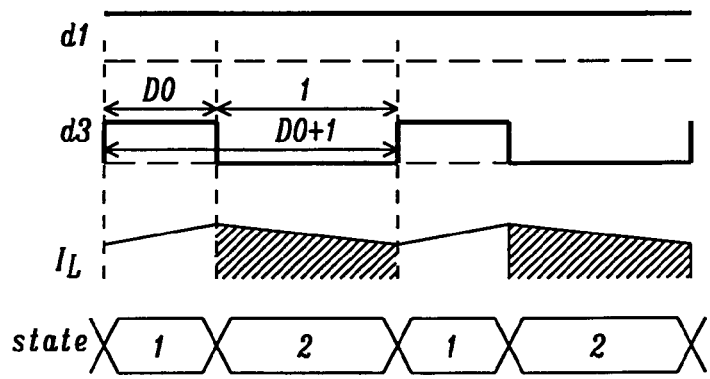
FIG. 5 shows a control sequence and inductor current in constant discharging-time boost mode.

In this regard, FIG. 5 shows a control sequence and inductor current in constant discharging-time boost mode B) Constant Discharging-Time Buck-Boost Mode As a buck-boost mode, this mode is introduced to accommodate the transition between buck and boost modes and to maintain high switching converter efficiency by maintaining a moderate inductor current.

In order to accommodate a smooth transition between the buck-boost mode and the constant discharging-time boost mode, the constant discharging-time control is also used in buck-boost mode that results in the following steady-state equations:

$V_I=V_g(2D_0-D_f), I_L=I_I(1-D_f+D_0)$

Figure 6:
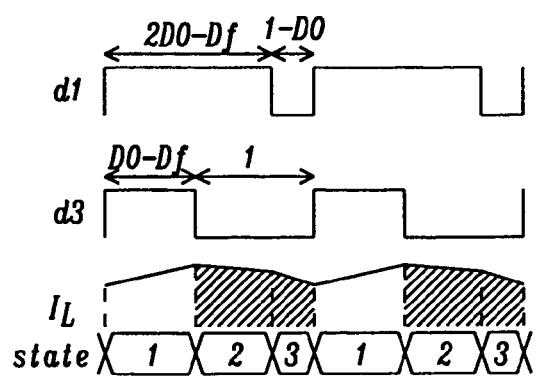
FIG. 6 shows a control sequence of constant discharging-time buck-boost mode.

In this regard, FIG. 6 shows a control sequence of constant discharging-time buck-boost mode C) Control Method for Buck-Boost Mode Transition The present embodiment of the control method combines constant frequency buck-mode and constant discharging-time boost mode and is in the following referred to as Extended-PWM-Control.

Two periodic waveform signals that change their relations and shape are generated depending on the output control deviation.

Buck mode is controlled by a single periodic waveform signal.

With the boost mode, a second periodic waveform signal becomes effective that time period is depending on the Ve1 control deviation and that extends the original period of the $1^{st}$ periodic waveform signal by tying this $1^{st}$ periodic waveform signal to its initial value.

Figure 7:
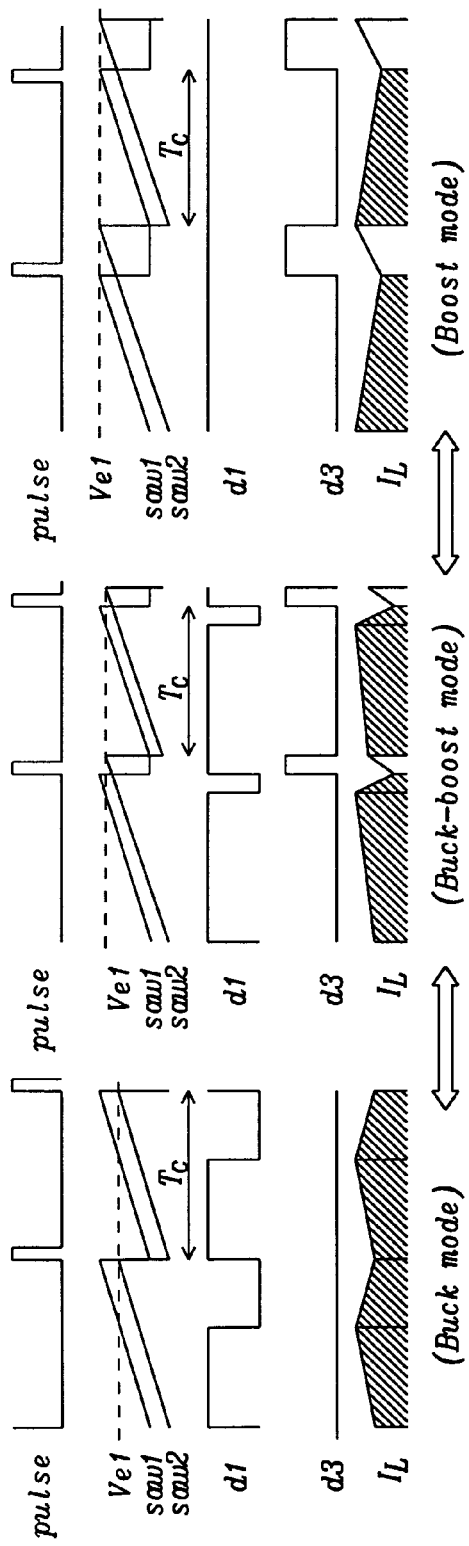
FIG. 7 shows an embodiment of an Extended-PWM control method for buck-boost mode transition.

A control method by means of variable saw tooth waveforms is depicted in FIG. 7.

The depicted EPWM control achieves automatic buck/boost mode selection by the relation of Ve1 and Vsaw1. The level-shift between Vsaw1 and Vsaw2 leads to an overlap of buck and boost mode, which results in a buck-boost mode for smooth transition.

In this implementation, the slope (i.e. dv/dt) of saw1 represents the gain of the buck mode, wherein the slope of saw2 represents the gain of the boost mode. The respective gains can be adjusted to meet the requirements of the loop compensation performance.

The offset voltage between the two variable waveforms at the transition between the buck and the buck-boost mode serves to define the buck-boost mode region and to accommodate minimum pulse width requirements for the d1 and d3 control signals.

Other embodiments can use 2 variable saw tooth waveforms of different slopes (i.e. d/dt(Vsaw2)<d/dt(Vsaw1) and without offset voltage) or e.g. one single variable waveform solution involving monoflops.

Another solution based on duty ratio depending mode transitions could look as follows:
Tsaw<T0: buck mode
Tsaw>T0: buck-boost mode
Tsaw>T0+Tx: boost mode A detailed implementation example of the Extended-PWM control approach (here implemented for a Single-Inductor Dual-Output Buck-Boost Converter) is discussed in the following.

Figure 8:
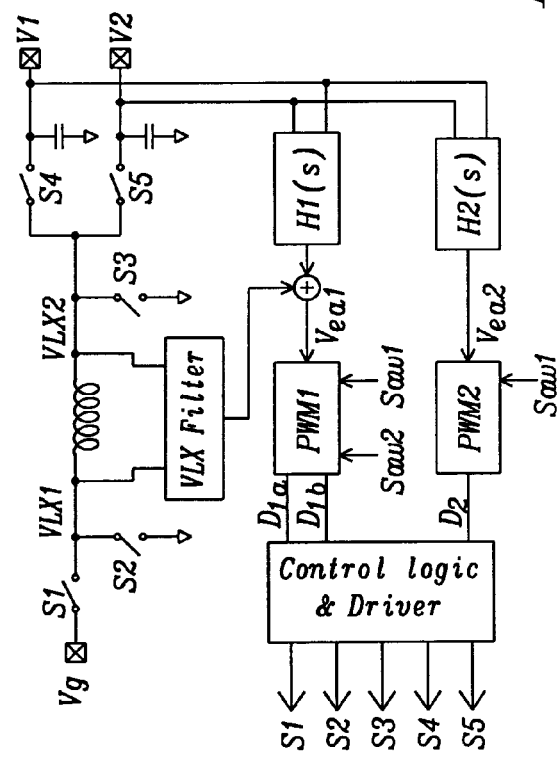
FIG. 8 shows a schematic of an embodiment of an architecture of a SIDO (Single-Inductor Dual-Output) buck-boost converter.

FIG. 8 shows a schematic of an embodiment of an architecture of the SIDO buck-boost converter. It consists of five switches S1-S5 in the power stage: S1, S2 and S3 regulate the total transferred energy by buck/boost conversion; S4 and S5 distribute the energy in the inductor to both outputs. All switches S1-S5 are controlled by PWM signals which are generated in two control loops. The converter is specified for two outputs from 1V to 5V with the maximum total power of 2.5 W and supply voltage ranging from 2.5V to 5V. The switching frequency is 2 MHz. The external inductor is 2.2 µH and the capacitor is 20 µF each.

Controlling the five power switches S1-S5 in the topology of FIG. 8 requires three independent duty ratio signals. A switching converter with PWM control usually generates duty ratio signal by comparing the error amplifier output $V_{ea1}$ with a saw tooth waveform Saw1. In a buck converter, the PWM signal $D_{1a}$ also represents the relation between output and supply voltage, thus $D_{1a}=V_{ea1}/V_{saw1}=V_{out}/V_g$. But this equation is only valid when $V_{ea1}<V_{saw1}$. If $V_{ea1}>V_{saw1}$, the transferred energy is not enough to supply the outputs in buck mode. The converter has to enter boost mode, where $D_{1a}=1$ and $D_{1b}$ is modulated. The present control, also referenced as Extended-PWM EPWM control, achieves automatic buck/boost mode selection by the relation of $V_{ea1}$ and $V_{saw1}$.

Figure 9:
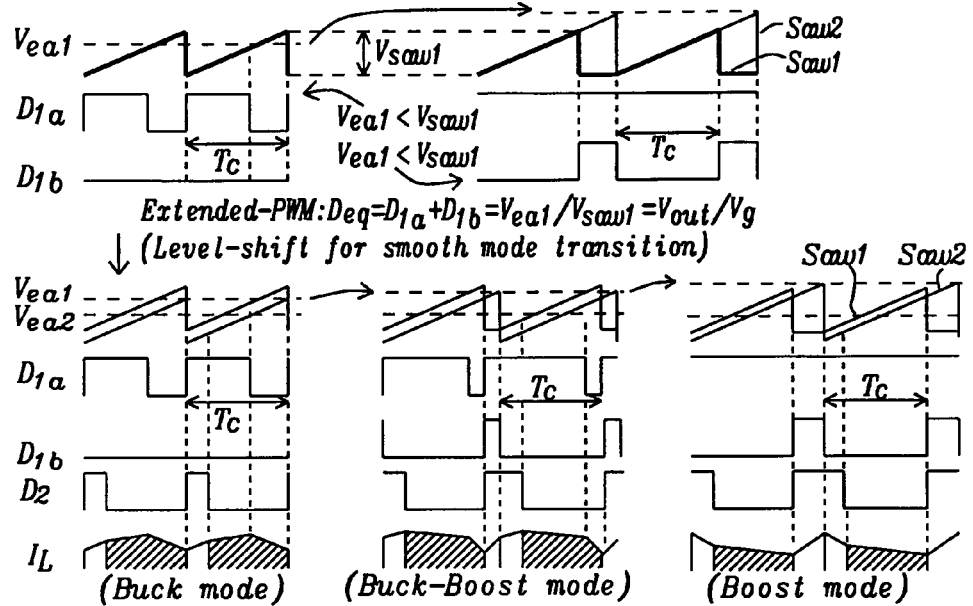
FIG. 9 shows a scheme of an Extended-PWM (EPWM) control for buck-boost conversion.

As shown in FIG. 9, there are two saw tooth waveforms used for $D_{1a}$ and $D_{1b}$ generation. When $V_{ea1}<V_{saw1}$, Saw2 is just the same as Saw1. When $V_{ea1}>V_{saw1}$, Saw2 ramps up to the amplitude of $V_{ea1}$ while Saw1 turns to ground. The buck signal $D_{1a}$ is here generated by comparing $V_{ea1}$ with Saw1, while the boost signal $D_{1b}$ is only high when $V_{ea1}$ is higher than $V_{saw1}$.

An equivalent PWM signal $D_{eq}$ can be expressed by the two signals: $D_{eq}=D_{1a}+D_{1b}=V_{ea1}N_{saw1}=V_{out}/V_g$, which extends the conversion ratio concept from a buck to a general switching converter.

Due to parasitic effects of the PWM signal generation, there would be a pulse skipping problem when $D_{eq}$ is close to 1. A small voltage may be added on Saw1 as level-shift to overcome this problem. The level-shift leads to an overlap of buck and boost mode, which results in a buck-boost mode for smooth transition.

FIG. 9 shows the duty ratio signal generation of the SIDO buck-boost converter with EPWM control. The buck switches S1 and S2 are controlled by $D_{1a}$, while the boost switch S3 by $D_{1b}$. The output switches S4 and S5 are controlled by $D_2$ and are only valid when S3 is off. The distribution PWM signal $D_2$ is generated by comparing $V_{ea2}$ with Saw1. As shown in FIG. 9, the sum duration of charging outputs keeps constant as $T_C$ whether in buck or in boost mode. The mode transition has little influence on the $V_{ea2}$ loop, which helps to attenuate the interaction between the two control loops of the SIDO system. Hence the proposed EPWM control is also suitable for multiple output converters.

Figure 10:
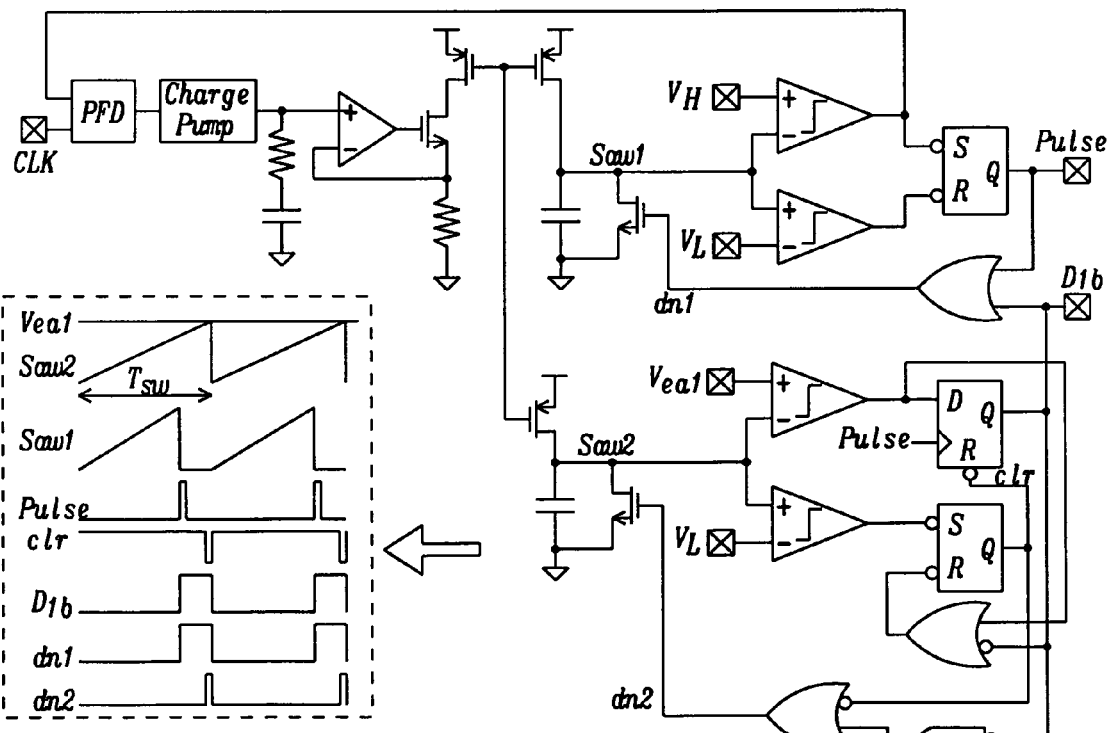
FIG. 10 shows a schematic of saw tooth waveform generation for EPWM control.

FIG. 10 shows a schematic of an embodiment of a saw tooth waveform generation of the EPWM control. At the rising edge of the Pulse signal, the comparing result of $V_{ea1}$ and Saw2 is detected for mode selection. When in buck mode, the saw tooth pull-down signal dn2 is the same as dn1. In boost mode, dn2 is only triggered when Saw2 reaches $V_{ea1}$. As described in FIG. 9, the EPWM control combines constant-frequency buck mode and constant-off-time boost mode. By adding a PFD and charge pump block, a PLL can be built to keep the switching frequency synchronized with an external clock. The bandwidth of PLL is designed to be lower than that of the SIDO control loop, which provides a pseudo constant-off-time boost mode to make system compensation easier.

The SIDO converter may be a multi-loop feedback system. The power stage small signal modeling and system decoupling analysis have been described in W. Xu, Y. Li, X. Gong, et al., "A Dual-Mode Single-Inductor Dual-Output Switching Converter with Small Ripple," *IEEE Trans. Power Electronics*, Vol. 25, No. 3, pp. 614-623, March. 2010.

Figure 11:
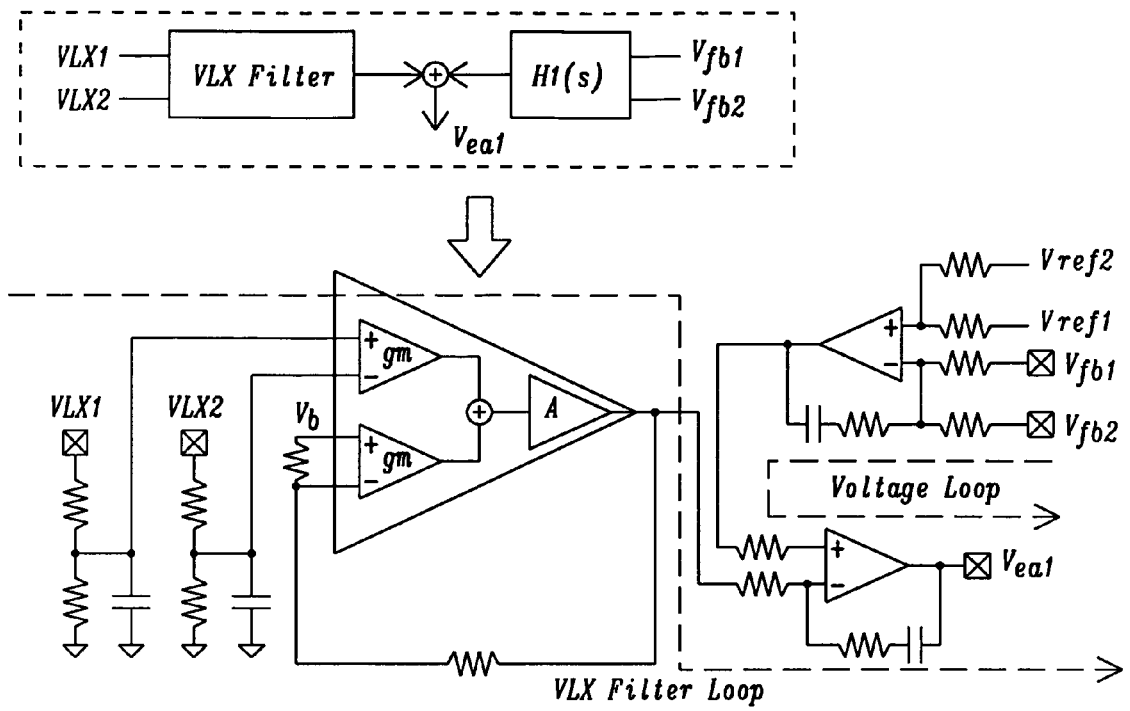
FIG. 11 shows a schematic of a VLX filter based compensation.

As illustrated in FIG. 8, a VLX filter is used for the $V_{ea1}$ loop compensation. VLX1 and VLX2 have a direct response to the PWM signals without the delay of an inductor current integration, which makes it suitable for system compensation in switching converters. Low pass filters are added at both nodes and an active feedback amplifier is used for the difference signal extraction. The VLX filter based compensation method in FIG. 11 is suitable for both buck and boost situations.

Figure 12:
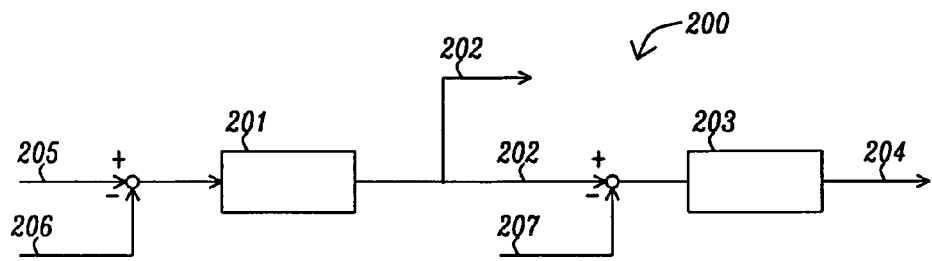
FIG. 12 shows a control system with a first controlling device for controlling the charging time and a second controlling device for controlling the discharging time.

FIG. 12 shows a control system 200 with a first controlling device 201 for controlling the charging time 202 and a second controlling device 203 for controlling the discharging time 204.

The first controlling device 201 receives an output voltage 205 of the switching converter and a reference voltage 206 and provides the controlled charging time 202 at its output.

The second controlling device 203 receives the controlled charging time 202 and a reference value 207 for the charging time and provides a controlled discharging time 204 at its output.

Figure 13:
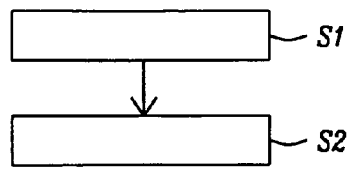
FIG. 13 shows an embodiment of a method for controlling a switching converter.

FIG. 13 shows an embodiment of a method for operating a switching converter.

In step S1, a switching converter is provided. The provided switching converter has a number N of outputs providing N output signals, at least one inductor and a number of switches. Said switching converter is operable at least in a boost mode.

In step S2, the charging time of the at least one inductor is controlled by means of at least the switches such that a discharging time of the at least one inductor is essentially constant.

What may have been described herein is merely illustrative of the application of the principles of the present invention. Further arrangements and systems may be implemented by those skilled in the art without departing from the scope and spirit of this invention.

While the invention has been particularly shown and described with reference to the preferred embodiments thereof, it will be understood by those skilled in the art that various changes in form and details may be made without departing from the spirit and scope of the invention.

What is claimed is:

1. A switching converter having a number N of outputs providing N output signals, said switching converter being operable in at least a boost mode, comprising:
   at least one inductor;
   a number of switches; and
   a controlling device for controlling a charging time of the at least one inductor at least by the switches such that a discharging time of the at least one inductor is constant.

2. The switching converter of claim 1, wherein the switching converter is operable in the boost mode, in a buck mode and in a buck-boost mode.

3. The switching converter of claim 2, comprising
   a first switch being coupled between a terminal providing a generator potential and an input terminal of the inductor;
   a second switch being coupled between the input terminal of the inductor and a ground terminal;
   a third switch being coupled between an output terminal of the inductor and the ground terminal;
   and at least one fourth switch being coupled between the output terminal of the inductor and one of the N outputs.

4. The switching converter of claim 2, wherein the controlling device is configured to provide at least one adjusting signal with constant duration in dependence on a control deviation of the output signal for driving the switches.

5. The switching converter of claim 2, further comprising an error amplifier, said error amplifier being configured to provide an error amplifier output signal, wherein the controlling device is configured to provide at least one adjusting signal with constant duration for converting the error amplifier output signal for driving the switches.

6. The switching converter of claim 2, wherein, in the boost mode and in the buck-boost mode, the switching converter is configured to extend a constant duration of a at least one adjusting signal for providing an adjustable first phase for the charging time and a constant second phase for the discharging time.

7. The switching converter of claim 6, wherein the switching converter is configured to adjust the first phase for the charging time in dependence on the actual voltage of the output signal.

8. The switching converter of claim 3, wherein the switching converter is configured to provide a drive signal for driving the third switch in dependence on an actual voltage of an output signal for adjusting the first phase for the charging time.

9. The switching converter of claim 1 wherein, in the boost mode, the controlling device is configured to provide a first adjusting signal with constant duration and a second adjusting signal with a variable duration, wherein the second adjusting signal has a longer duration than the first adjusting signal, said variable duration being adapted in dependence on the control deviation of the output signal.

10. The switching converter of claim 2 wherein, in the buck-boost mode, the controlling device is configured to provide a first adjusting signal with constant duration and a second adjusting signal with a variable duration, wherein the second adjusting signal is amplitude-shifted compared to the first adjusting signal, said variable duration being adapted in dependence on the control deviation of the output signal.

11. The switching converter of claim 2 wherein, in the buck mode, the controlling device is configured to control the transition from the buck mode to the buck-boost mode or to the boost mode in dependence on the difference or ratio of the adjusting signal and the value of the constant duration.

12. The switching converter of claim 1 wherein, in the boost mode, the controlling device is configured to control the transition from the boost mode to the buck-boost mode or to the buck mode in dependence on the difference or ratio of the value of the variable duration of the adjusting signal and the value of the constant duration.

13. The switching converter of claim 9, wherein said variable duration is adapted in dependence on an error amplifier output signal.

14. The switching converter of claim 9 wherein the first adjusting signal and the second adjusting signal are embodied as saw tooth signals, wherein the peak of the second adjusting signal corresponds to the amplitude of an error amplifier output signal.

15. The switching converter of claim 3 wherein, in the buck mode, the controlling device is configured to provide one single adjusting signal with constant duration.

16. The switching converter of claim 15, wherein the adjusting signal is embodied as a saw tooth signal.

17. The switching converter of claim 5 wherein the switching converter is configured to provide a drive signal for driving the first switch by comparing the adjusting signal with the error amplifier output signal.

18. The switching converter of one of claim 1 comprising a further controlling device for controlling the discharging time such that a cycle time corresponding to a sum of the charging time and the discharging time remains constant, wherein said further controlling device has a slower response than the controlling device.

19. The switching converter of claim 18 wherein the further controlling device is a Phase-Locked Loop (PLL).

20. The switching converter of claim 1 wherein $N \geq 2$.

21. A method for operating a switching converter comprising
providing a switching converter, being operable in at least a boost mode, having a number N of outputs generating N output signals, a number of switches, a controlling device, and at least one inductor; and
controlling a charging time of the at least one inductor by means of at least the switches such that a discharging time of the at least one inductor is constant.

22. The method of claim 21 wherein the switching converter is operable in the boost mode, in a buck mode and in a buck-boost mode.

23. The method of claim 22 wherein said number of switches comprises a first switch being coupled between a terminal providing a generator potential and an input terminal of the inductor, a second switch being coupled between the input terminal of the inductor and a ground terminal, a third switch being coupled between an output terminal of the inductor and the ground terminal and at least one fourth switch being coupled between the output terminal of the inductor and one of the N outputs.

24. The method of claim 21 wherein the controlling device is configured to provide at least one adjusting signal with constant duration in dependence on a control deviation of the output signal for driving the switches.

25. The method of claim 22 further providing an error amplifier, said error amplifier being configured to provide an error amplifier output signal, wherein the controlling device is configured to provide at least one adjusting signal with constant duration for converting the error amplifier output signal for driving the switches.

26. The method of claim 22 wherein, in the boost mode and in the buck-boost mode, the switching converter extends a constant duration of a at least one adjusting signal for providing an adjustable first phase for the charging time and a constant second phase for the discharging time.

27. The method of claim 26 wherein the switching converter adjusts the first phase for the charging time in dependence on the actual voltage of the output signal.

28. The method of claim 23 wherein the switching converter provides a drive signal for driving the third switch in dependence on an actual voltage of an output signal for adjusting the first phase for the charging time.

29. The method of claim 21 wherein, in the boost mode, the controlling device provides a first adjusting signal with constant duration and a second adjusting signal with a variable duration, wherein the second adjusting signal has a longer duration than the first adjusting signal, said variable duration being adapted in dependence on the control deviation of the output signal.

30. The method of claim 22 wherein, in the buck-boost mode, the controlling device provides a first adjusting signal with constant duration and a second adjusting signal with a variable duration, wherein the second adjusting signal is amplitude-shifted compared to the first adjusting signal, said variable duration being adapted in dependence on the control deviation of the output signal.

31. The method of claim 22 wherein, in the buck mode, the controlling device controls the transition from the buck mode to the buck-boost mode or to the boost mode in dependence on the difference or ratio of the adjusting signal and the value of the constant duration.

32. The method of claim 21 wherein, in the boost mode, the controlling device controls the transition from the boost mode to the buck-boost mode or to the buck mode in dependence on the difference or ratio of the value of the variable duration of the adjusting signal and the value of the constant duration.

* * * * *